Dec. 12, 1967    P. TIFFANY    3,357,090
VIBRATORY WELDING TIP AND METHOD OF WELDING
Filed May 23, 1963    2 Sheets-Sheet 1
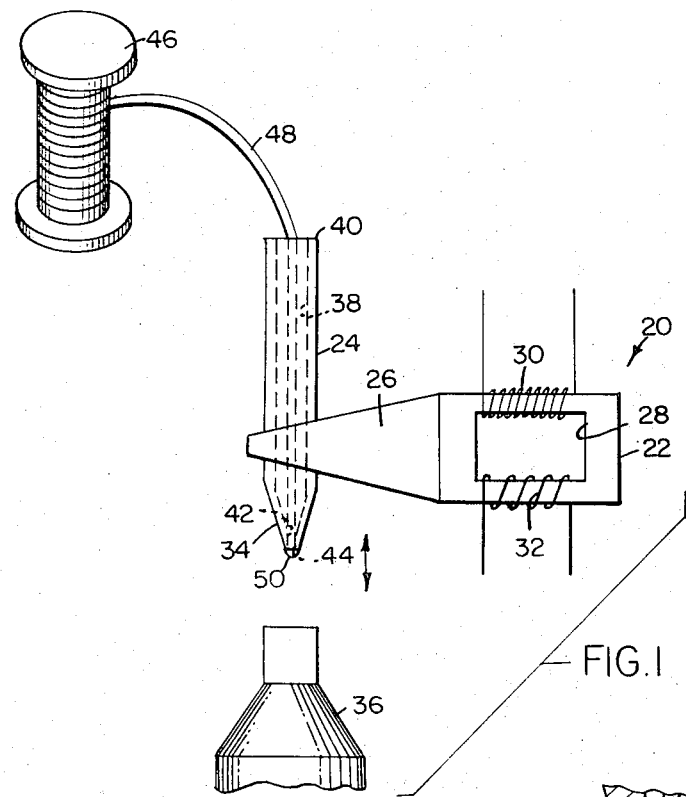
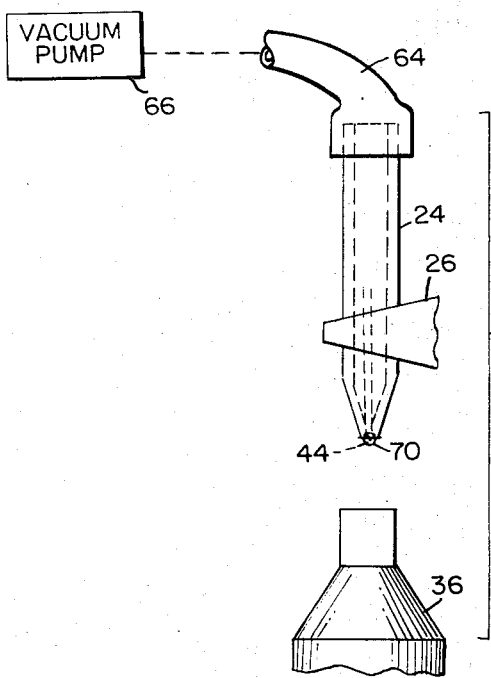
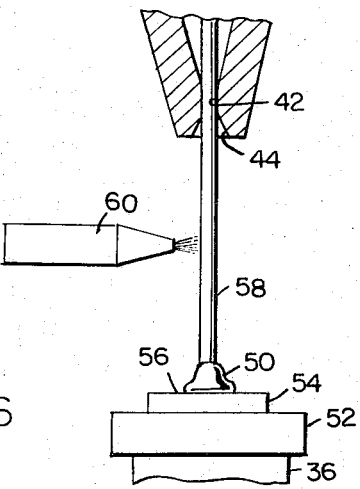
INVENTOR.
Paul Tiffany
BY
Ezekiel Wolf, Wolf & Greenfield
ATTORNEYS Dec. 12, 1967 — P. TIFFANY — 3,357,090
VIBRATORY WELDING TIP AND METHOD OF WELDING
Filed May 23, 1963 — 2 Sheets-Sheet 2
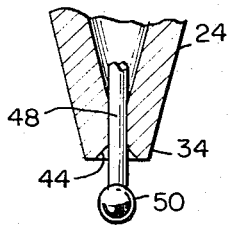
FIG. 3
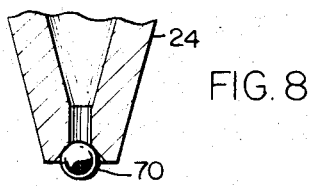
FIG. 8
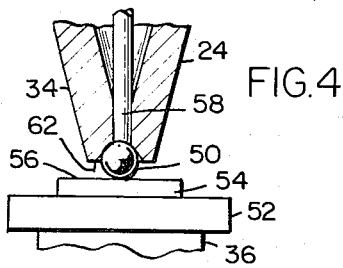
FIG. 4
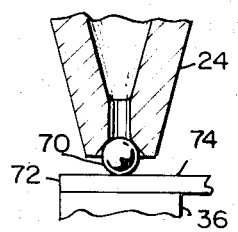
FIG. 9
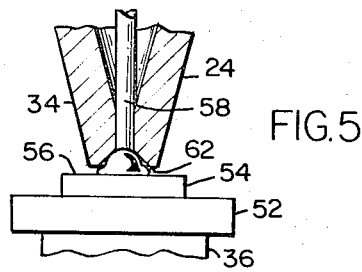
FIG. 5
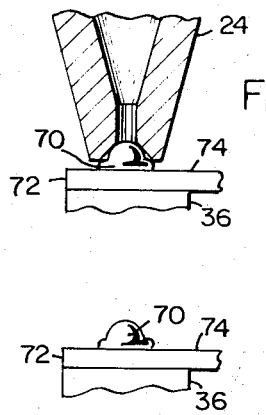
FIG. 10
FIG. 11
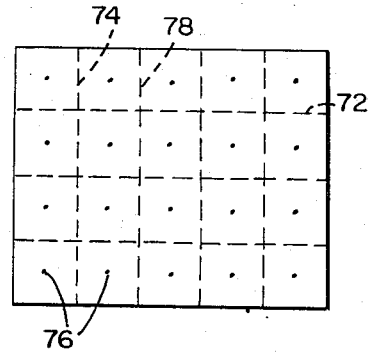
FIG. 7
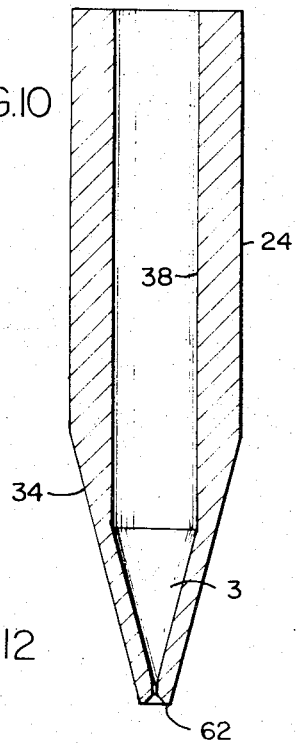
FIG. 12
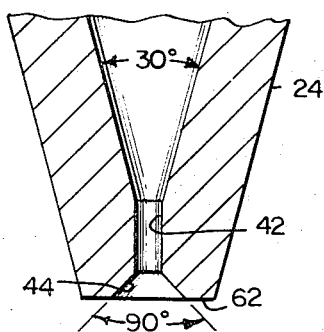
FIG. 13
INVENTOR.
Paul Tiffany
BY Ezekiel Wolf, Wolf & Greenfield
ATTORNEYS

United States Patent Office 3,357,090
Patented Dec. 12, 1967

3,357,090
VIBRATORY WELDING TIP AND METHOD OF WELDING
Paul Tiffany, Beverly, Mass., assignor to Transitron Electronic Corporation, Wakefield, Mass., a corporation of Delaware
Filed May 23, 1963, Ser. No. 282,711
7 Claims. (Cl. 29—470)

This invention relates to semiconductor welding techniques and more particularly comprises a new and improved method of and apparatus for securing conductors to the bodies of semiconductor devices.

At the present time compression bonding is unversally employed in the manufacture of semiconductors to secure gold wires and balls to slices and dices. Conventionally in the manufacture of such devices as control rectifiers the compression bonding of the gold balls to the body is conducted after the body or wafer is alloyed to the header, and the heat generated during compression bonding weakens the bond between the wafer and the header. Furthermore, the heat generated, unless extreme caution is exercised, often causes a short circuit in the wafer, which destroys its usefulness. In the manufacture of planar diodes and similar devices it has heretofore been difficult to attach gold balls to a slice because the slice could not be subjected to the heater during the prolonged period required to attach several balls by compression bonding to the slice. Therefore it has been conventional practice first to cut the slices into dice and thereafter attach a single gold ball to each of the die cut.

One important object of this invention is to provide a method of and apparatus for attaching balls and wires to slice and die bodies which eliminates the use of heat so as to avoid oxidation and weakening of previously made bonds, and which further in certain cases, eliminates the use of aluminum vaporization.

Another object of this invention is to simplify and reduce the cost of manufacturing semiconductor devices.

Yet another important object of this invention is to modify ultrasonic welding equipment so that it may be used in the assembling and subsequent welding of gold wires and balls to devices.

A more general object of this invention is to improve both mechanically and electrically the quality of welds in semiconductor devices.

To accomplish these and other objects this invention includes among its features the use of ultrasonic welding equipment both to transport wire and balls to the wafers to which they are to be secured and thereafter bond the wire or balls to the bodies. To attach a wire to a slice or die, the quill of the ultrasonic welder is provided with an internal bore through which the wire is threaded so that it extends out the tip of the quill. The tip of the quill is countersunk so as to form a frusto-conical cavity or seat into which the ball formed on the end of the wire may be drawn and then carried to the wafer. When balls are to be secured to wafers or slices the bore through the quill is used to apply a vacuum to the frusto-conical shaped seat in the quill tip which allows the quill to pick up a ball and transport it to the precise point on the wafer or slice where it is to be welded. During actual welding the countersink serves to retain the ball in the precise location.

These and other objects and features of this invention will be better understood and appreciated from the following detailed description of several embodiments thereof, selected for purposes of illustration and shown in the accompanying drawing, in which:

FIG. 1 is a diagrammatic view of an ultrasonic welder employed to secure wire to a wafer, constructed in accordance with this invention;

FIGS. 2-5 are a series of diagrammatic views illustrating the sequence of steps for securing wire to a device using the apparatus of FIG. 1;

FIG. 6 is a diagrammatic view of the same apparatus shown in FIG. 1 as it is employed to secure a ball to a wafer or slice;

FIG. 7 is a plan view of a slice on which balls are to be welded;

FIGS. 8-11 are a series of diagrammatic views illustrating the sequence of steps for securing a ball to the slice of FIG. 7;

FIG. 12 is an enlarged cross-sectional view of a portion of the apparatus shown in FIGS. 1 and 6; and FIG. 13 is an enlarged cross-sectional detail of the device shown in FIG. 12.

The vibratory welder 20 shown in FIG. 1 includes a transducer 22 which provides the vibratory motion to a sonotrode or quill 24 through coupling member 26. The transducer 22 may have a laminated core of nickel or other magnetostrictive metallic material, and may have a rectangularly shaped opening 28 in its center. A polarizing coil 30 and an excitation coil 32 may be wound through the opening 28 of the transducer, and upon variations of the magnetic field strength of the excitation coil there are produced concomitant variations in the dimensions of the transducer 22, provided the polarizing coil 30 is charged at a suitable level with D-C current. For the application of the welder described below, it may operate in the frequency range of 60,000 cycles per second. It is to be understood that the transducer per se forms no part of this invention but rather, is old in the art as demonstrated by its detailed description in Jones Patent No. 3,056,192 dated Oct. 2, 1962, and De Prisco Patent No. 3,002,270 dated Oct. 3, 1961.

Disposed beneath and aligned with the tip 34 of quill 24 is an anvil 36 adapted to support the work to be welded by the device. The quill 24 as is evident in FIG. 1 is provided with an axial bore 38 which extends downwardly from its top 40 to a restricted throat 42 within the tip 34. The throat 42 in turn terminates in a frusto-conical shaped counter bore 44. The quill 24 is shown in greater detail in FIGS. 12 and 13 and its character is amplified below in connection with those figures.

In FIG. 1 a spool 46 is shown to contain a roll of wire 48 which extends downwardly through the bore 38, throat 42 and counter bore 44 where the wire terminates in a ball 50. The ball formed on the end of the wire may be captured in the counter bore or seat 44 and guided by means of the quill 24 to the spot on the work (not shown) aligned with the tip 34 of the quill and carried on the anvil. The manner in which this apparatus may be used in the manufacture of a semiconductor device is illustrated in FIGS. 2-5. While a typical use of the apparatus is to secure gold wires and balls to a slice or dice of silicon, the user is by no means limited to devices made of such materials.

In FIG. 2 the anvil 36 is shown supporting the header 52 of a semiconductor upon which a wafer 54 made of silicon or some other material is alloyed. The ball 50 made of gold or similar metal is shown welded to the upper surface 56 of the wafer 54 and is carried on the end of wire 58. It will be noted in FIG. 2 that the wire 58 extends through the counter bore 44, throat 42 and bore 38 of the quill.

In accordance with the present invention the wire 58 is flame cut as suggested by the presence of burner 60. Flame cutting of the wire 58 results in the formation of the ball 50 below the tip 34 of the quill 24 as the wire extends through the quill from spool 46. After the wire is flame cut separating it from the previously deposited wire and forming the ball as in FIG. 3, and after the next device is placed on the anvil, the quill 24 is lowered until the ball 50 is captured in the frusto-conical seat 44, and the quill is further lowered until the ball 50 in the seat 44 rests upon the upper surface 56 of the wafer 54 as illustrated in FIG. 4. It will be noted in FIG. 4 that the bottom 62 of the tip 34 of the quill rests an appreciable distance above the surface of the wafer 54 and will not interfere with the limited amount of flow which takes place as the ball spreads to form a bell-shaped configuration as shown in FIGS. 2 and 5. In FIG. 5, the quill 24 is shown in its lowermost position as the welding is completed, and it will be noted that the lower surface 62 of the quill is an appreciable distance above the upper surface 56 of the wafer.

When the welding is completed (the ball 50 is firmly bonded to the wafer) the quill 24 may be returned to the position shown in FIG. 2, and the cycle may be repeated by severing the wire by the flame cutter 60 to both cut the wire and form a new ball to be deposited on the next device.

The quill 24 performs the welding function in the conventional manner as is described in the Jones and De Prisco patents supra. The departure from those patents insofar as the manner in which the device is employed lies in the use of the specially formed quill having a longitudinally extending bore through its body and the frusto-conical seat in tip 34. The seat is sized to receive the ball and prevent it from running over the surface of the wafer particularly at the instant vibration begins. Thus, the tip serves to precisely position the ball at the place it is to be welded.

In FIG. 6 the quill 24 is shown to be connected to a flexible hose 64 in turn connected to a vacuum pump 66. The vacuum pump 66 enables the quill 24 to pick up a ball 70 as shown in FIG. 6 in its frusto-conical seat 44 by creating a low pressure area at that region. The quill 24 is carried by a coupling 26 which in turn connects it to a transducer (not shown) identical to that of FIG. 1. Thus, the assembly shown in FIG. 6 differs from that in FIG. 1 in the use of a flexible hose 64 connected to a vacuum pump 66 rather than running a wire from a spool through the quill bore. In the arrangement of FIG. 6, the ball 70 is not connected to or disposed on the end of a wire. The manner in which the apparatus of FIG. 6 may be employed is shown in FIGS. 7–11.

In FIG. 7 a slice 72 made of silicon or some similar material is shown to have on its surface 74 a maze of dots 76 which identify the future location of the balls. Typically the device being fabricated is a planar diode having a silicon die and gold ball.

The slice 72 may be disposed on the anvil 36 in preparation to receive the gold ball. Ordinarily in the manufacture of diodes a slice is diced before the gold balls are welded in place, as the heat which would be picked up by the slice if left on the heater while all of the balls were compression bonded on it would adversely affect the components. However, by employing the sonic welding technique, no heat is generated to adversely affect the slice and accordingly the more desirable method of bonding each of the gold balls in place on the slice and thereafter cutting the slice into the separate devices may be used. In accordance with the present invention the quill 24 is aligned with one dot 76 on the slice 72 by use of a microscope or other similar technique and viewing the dot through the bore extending through the quill. After the quill is aligned with the dot it is moved to a position to pick up a ball in its seat 44, and the ball is held in place in the seat by the vacuum applied to the quill through the flexible hose 64 and the internal quill bore as suggested in FIG. 8. The quill 24 then conveys the ball 70 to the surface 74 of the slice (see FIG. 9), and it may be automatically realigned with the dot 76 as previously established. The transducer is then excited to cause the quills 24 to weld the ball 70 on the slice as is shown in FIG. 10. It will be noted in that figure that the ball becomes bell-shaped on the upper surface 74 just as in the case with the wire connected ball 50 of the device shown in FIGS. 2 and 5. After the welding is completed the vacuum may be shut off. By some automatic means such as a special control table the slice on the anvil may be moved to bring the next dot of the slice into alignment with the quill. The sequence may then be repeated until a gold ball is welded over each of the dots on the slice. Thereafter the slice may be divided into many dice by cutting the slice in the manner as suggested in FIG. 7 by broken lines 78.

In FIGS. 12 and 13 the quill 24 used in each of the methods described is shown in detail. In that figure the quill is shown to have a generally tapered tip 34 which reduces in size toward its end 62. In FIG. 13 the tapered tip 34 is shown to define an included angle of approximately 30°, and the flare of the frusto-conical seat is about 90°.

The bore 38 has a uniform diameter to a point within the tip 34 where the bore reduces in diameter at a rate equal to the rate of reduction of the diameter of the tip, and consequently the tip has a uniform wall thickness. Thus, the passage 38 converges at an angle of 30° to the throat 42 where again a uniform diameter is provided to the seat 44.

The dimensions of the quill shed some light upon the overall size of the components and give an indication of the refinement which may be obtained with the use of this equipment. The length of the quill is determined by the size of the vibrating assembly and is in the range of .255". The diameter of the throat 42 will just exceed the diameter of the wire used when the quill is employed in the manner shown in FIG. 1. Thus, if .0018" diameter wire is used, the diameter of the throat 42 will be approximately .0020". While the length of the throat is not critical it may conveniently be approximately .005". When wire is flame cut to form a ball, the ball so formed has a diameter approximately 2½–3 times as large as the wire and this rule of thumb makes it possible to select the best size counter bore. When the fine diameter wire referred to is used, the diameter of the counter bore at the surface 62 may be approximately .0060" while the diameter of the tip at the surface 62 may be approximately .010". When .0025" diameter wire is used, the throat 42 may have a diameter of about .0027", the diameter of the counter bore 44 may be approximately .0075", and the major diameter of the end face 62 may be .011".

Having described this invention in detail, those skilled in the art will appreciate that numerous modifications may be made of it without departing from its spirit. Therefore, I do not intend to limit the breadth of this invention to the embodiments illustrated and described. Rather, it is intended that the scope of this invention be determined by the appended claims and their equivalents.

What is claimed is:

1. A device for securing a ball terminal to the body of semiconductor devices comprising
   a vibratory welder having a quill and a transducer for vibrating the quill,
   a passage extending through the quill and terminating at the quill tip through which a wire may be fed or a vacuum applied to the tip, and
   a frusto-conical seat provided at the tip of the quill as a continuation of the passage for receiving the ball to be secured to the body of the device and retain the ball against the device in a fixed position.

2. A device as defined in claim 1 further characterized by a vacuum line secured to the passage away from the quill tip for retaining the ball in the seat at the end of the passage in the tip.

3. A device as defined in claim 1 further characterized by a throat of uniform diameter provided in the passage immediately behind the seat and of a diameter just exceeding the diameter of a wire on which the ball to be secured is formed for receiving the wire and positioning it in the quill.

4. A method of securing a ball to a body of a semiconductor device comprising the steps of
providing a quill of a vibratory welder with a seat formed in its tip,
establishing a low pressure region about the seat for picking up a ball in the seat,
utilizing the low pressure at the seat to pick up a ball and thereafter conveying the ball in the seat to the body of the device,
and thereafter vibrating the quill to weld the ball to the body.

5. A quill and vibrator for a vibratory welder comprising
an elongated body,
a transducer secured to the quill for vibrating it,
a passage extending through the body,
a restricted region in the passage of relatively small diameter adjacent the tip of the body,
and a seat extending inwardly from the end of the tip and immediately adjacent the restricted region, said seat being shaped to engage a ball to be welded by the vibratory welder.

6. A quill as defined in claim 5 further characterized by said seat being frusto-conical in shape and having a diameter at the tip end greater than the diameter at the inner end at the restricted region.

7. A quill for a vibratory welder for securing a wire and ball lead to the body of a semiconductor comprising a body to which a vibrating transducer may be connected and having a passage through which wire may be threaded, said passage extending to the tip of the body,
a restricted region in the passage adjacent the end of the tip just exceeding the diameter of the wire lead,
and an outwardly flared region provided as part of the passage and extending from the restricted region to the tip end, said flared region being capable of receiving a portion of the ball.

References Cited

UNITED STATES PATENTS

| | | |
|---|---|---|
| 2,154,243 | 4/1939 | Langhans _____ 219—103 |
| 2,970,089 | 2/1961 | Cornelison. |
| 2,972,092 | 2/1961 | Nelson. |
| 2,985,954 | 5/1961 | Jones et al. _____ 29—497.5 XR |
| 3,125,906 | 3/1964 | Johnson _____ 29—497.5 XR |
| 3,149,415 | 9/1964 | Hyver _____ 29—497.5 XR |
| 3,165,818 | 1/1965 | Soffa et al. _____ 29—493 XR |
| 2,823,809 | 2/1958 | May _____ 214—1 |
| 2,915,201 | 12/1959 | Calehuff et al. _____ 214—1 |
| 3,125,803 | 3/1964 | Rich _____ 29—497.5 |
| 3,144,168 | 8/1964 | Campbell _____ 221—11 |
| 3,250,452 | 5/1966 | Angelucci et al. _____ 228—3 |

JOHN F. CAMPBELL, *Primary Examiner.*

MARTIN L. FAIGUS, *Assistant Examiner.*